US012379826B2

(12) United States Patent
Jayaraman

(10) Patent No.: US 12,379,826 B2
(45) Date of Patent: Aug. 5, 2025

(54) NETWORK EFFICIENCY USING TARGETED ACTION SELECTION

(71) Applicant: Truist Bank, Charlotte, NC (US)

(72) Inventor: Barath Jayaraman, Fort Mill, SC (US)

(73) Assignee: TRUIST BANK, Charlotte, NC (US)

( * ) Notice: Subject to any disclaimer, the term of this patent is extended or adjusted under 35 U.S.C. 154(b) by 0 days.

(21) Appl. No.: 18/193,263

(22) Filed: Mar. 30, 2023

(65) Prior Publication Data

US 2024/0329809 A1 Oct. 3, 2024

(51) Int. Cl.
*G06F 3/048* (2013.01)
*G06F 3/0484* (2022.01)
*G06Q 30/0201* (2023.01)

(52) U.S. Cl.
CPC ....... *G06F 3/0484* (2013.01); *G06Q 30/0201* (2013.01)

(58) Field of Classification Search
None
See application file for complete search history.

(56) References Cited

U.S. PATENT DOCUMENTS

| | | | | |
|---|---|---|---|---|
| 2009/0254412 A1* | 10/2009 | Braswell | ............ | G06Q 30/0251 705/14.1 |
| 2009/0271267 A1* | 10/2009 | Moukas | ............. | G06Q 30/0267 705/14.58 |
| 2010/0257022 A1* | 10/2010 | Wang | ................. | G06Q 30/0242 705/14.42 |
| 2011/0231223 A1* | 9/2011 | Winters | ............. | G06Q 30/0201 705/14.1 |
| 2012/0158461 A1* | 6/2012 | Aldrey | ............... | G06Q 30/0242 705/7.29 |
| 2013/0246189 A1* | 9/2013 | Patel | .................. | G06Q 30/0269 705/14.67 |
| 2015/0170175 A1* | 6/2015 | Zhang | ................. | H04M 15/851 705/7.33 |
| 2015/0347112 A1* | 12/2015 | Kosmynka | .......... | G06F 11/3438 717/176 |
| 2015/0348083 A1* | 12/2015 | Brill | ..................... | G06Q 20/386 705/14.23 |
| 2016/0086222 A1* | 3/2016 | Kurapati | ................ | G06Q 40/08 705/14.53 |
| 2020/0410551 A1* | 12/2020 | Zhou | ....................... | G06N 20/00 |
| 2022/0245656 A1* | 8/2022 | Leach | ................ | G06Q 30/0234 |
| 2023/0093267 A1* | 3/2023 | Levy | .................. | G06Q 30/0269 705/14.66 |

* cited by examiner

*Primary Examiner* — Hua Lu
(74) *Attorney, Agent, or Firm* — Michael A. Springs, Esq.; Shumaker, Loop & Kendrick, LLP; Patrick B. Horne

(57) ABSTRACT

A system including a computing device with at least one processing device and at least one memory device, wherein the computing device executes computer-readable instructions, and a network operatively connecting the computing device to at least one user device. Upon execution of the computer-readable instructions, the at least one processing device is configured to provide, via the network, a user selectable mechanism. The user selectable mechanism is configured to permit at least one user to select at least one targeted action. The user selectable mechanism is displayed, via a graphical user interface, on the at least one user device. The at least one processing device is configured to initiate the at least one targeted action when the user selectable mechanism is engaged by the user.

18 Claims, 2 Drawing Sheets

NETWORK EFFICIENCY USING TARGETED ACTION SELECTION

FIELD

This disclosure relates generally to an enterprise system, and more particularly embodiments of the presently described subject matter relate to a system and method for improving network efficiency using targeted action selection.

BACKGROUND

It is known for a business entity to utilize organized marketing campaigns in order to establish and/or strengthen a relationship between the business entity and participants in the campaign, which may correspond to customers and/or prospective customers of the business entity. The campaign gives a positive impression of the business entity to the participant, and may also may incentivize continued interaction between the participant and the business entity throughout the course of the campaign, as applicable. Such campaigns may also be linked to popular culture or current events, such as having a link to a specific product, holiday season, school event, sporting event, entertainment franchise, or celebrity, which allows for the participant in the campaign to make a shared association between the business entity and the corresponding topic of interest. Such positive interactions occurring between the participant and the business entity can accordingly increase future engagement therebetween, which can in turn result in additional opportunities for the business entity to tender products and/or services to the participant.

Such campaigns or similar customer engagements also provide an opportunity for the corresponding business entity to acquire information regarding each of the participants thereto. For example, it is common for each participant to input certain personal information regarding the identity and contact information thereof when requested to enter into and/or engage with such a campaign. However, some participants of virtual marketing campaigns may not be interested in the products and/or services being tendered in every campaign of the business entity.

It is therefore desirable to produce a system and method utilizing the beneficial aspects of conducting such a campaign in order to acquire additional relevant information regarding each participant in the campaign, where such information can be utilized to improve engagement between the business entity and each of the participants. It is also desirable to produce a system and method configured to allow a user to select targeted actions to be taken by the business entity related to the tendering of products and/or services.

BRIEF SUMMARY

Embodiments of the present invention address the above needs and/or achieve other advantages by providing systems and methods to improve network data flow efficiency by allowing users to select targeted actions to be taken by an enterprise system.

In one embodiment, a system for improving network efficiency using targeted action selection, the system comprises: a computing system with at least one processing device and at least one memory device, wherein the computing system executes computer-readable instructions; and a network operatively connecting the computing system to at least one user device; wherein, upon execution of the computer-readable instructions, the at least one processing device is configured to: provide, via the network, a user selectable mechanism configured to permit at least one user to select at least one targeted action; display the user selectable mechanism, via a graphical user interface, on the at least one user device; and initiate the at least one targeted action when the user selectable mechanism is engaged by the user.

In another embodiment, a method for improving network efficiency using targeted action selection, comprises the steps of: providing a system including a computing device with at least one processing device and at least one memory device, wherein the computing device executes computer-readable instructions, and a network operatively connecting the computing device to at least one user device; providing, via the network, a user selectable mechanism configured to permit at least one user to select at least one targeted action; displaying the user selectable mechanism, via a graphical user interface, on the at least one user device; and initiating the at least one targeted action when the user selectable mechanism is engaged by the user.

As aspects of some embodiments, the user selectable mechanism is configured to be engaged by direct contact of the user with the graphical user interface.

As aspects of some embodiments, the user selectable mechanism is provided in an electronic communication to the at least one user device.

As aspects of some embodiments, the user selectable mechanism includes at least one control element to select the at least one targeted action.

As aspects of some embodiments, the at least one targeted action is completed by at least one of the computing system and at least one agent.

As aspects of some embodiments, the at least one targeted action is a communication from the at least one agent.

As aspects of some embodiments, the at least one processing device is configured to provide personal data of at least one user to be used by the at least one agent for the at least one targeted action.

As aspects of some embodiments, upon selection of the user selectable mechanism, a communication related to the at least one targeted action is transmitted, via the network, from the at least one user device to the at least one processing device.

As aspects of some embodiments, upon receipt of the communication related to the at least one targeted action from the at least one user device, the processing device is configured to transmit an electronic notification to the at least one agent to initiate the at least one targeted action.

As aspects of some embodiments, the at least one processing device is configured to store the communication related to the at least one targeted action as personal data of at least one user. The features, functions, and advantages that have been described herein may be achieved independently in various embodiments of the present disclosure including computer-implemented methods, computer program products, and computing systems or may be combined in yet other embodiments, further details of which can be seen with reference to the following description and drawings.

BRIEF DESCRIPTION OF THE DRAWINGS

One or more aspects are particularly pointed out and distinctly claimed as examples in the claims at the conclusion of the specification. The foregoing as well as objects, features, and advantages of one or more aspects are apparent from the following detailed description taken in conjunction with the accompanying drawings in which:

DETAILED DESCRIPTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

Figure 1:
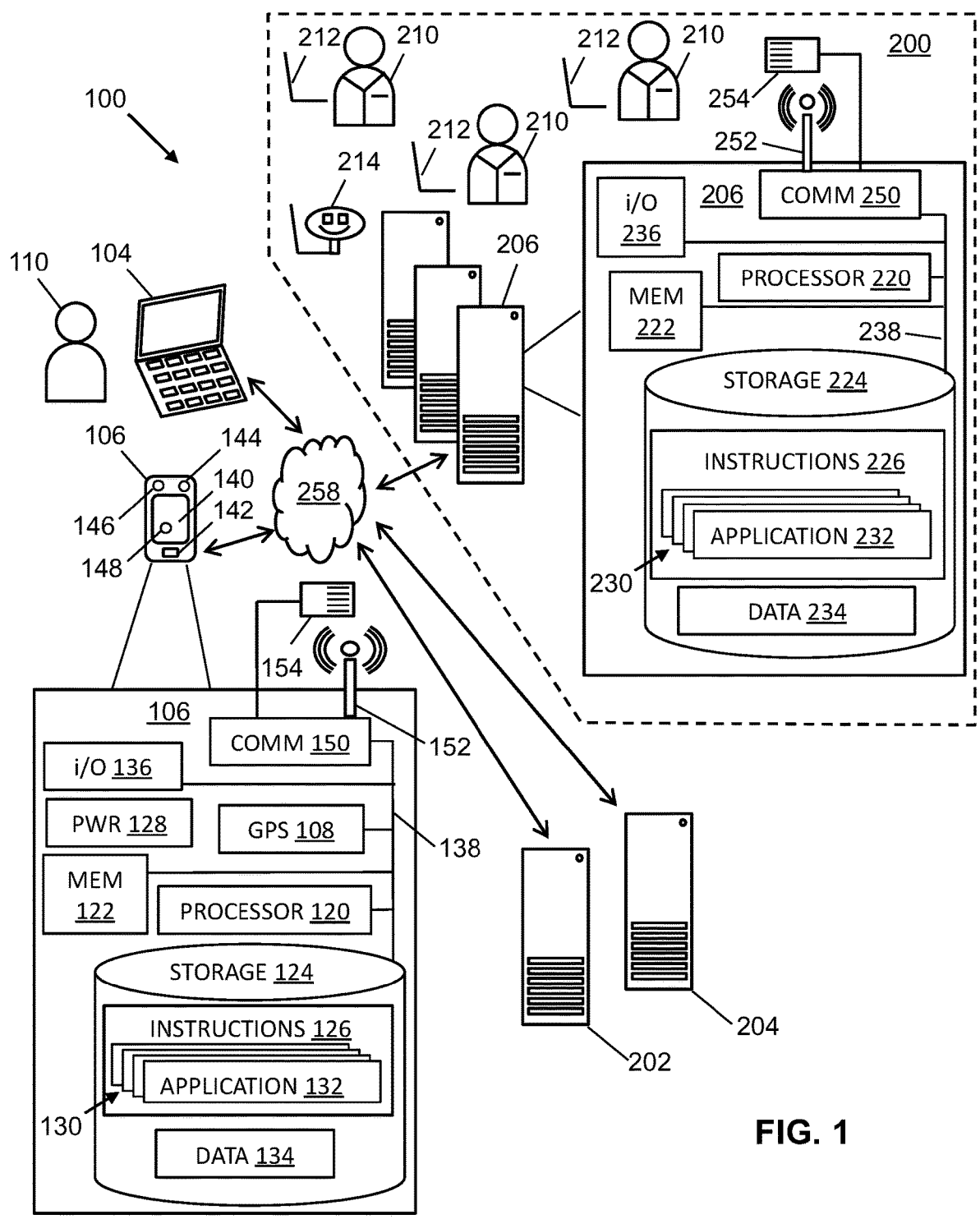
FIG. 1 illustrates an enterprise system, and environment thereof for improving network efficiency using targeted action selection in accordance with an embodiment of the present disclosure.

FIG. 1 illustrates a system 100 and environment thereof, according to at least one embodiment, by which a user 110 benefits through use of services and products of an enterprise system 200. The environment may include, for example, a distributed cloud computing environment (private cloud, public cloud, community cloud, and/or hybrid cloud), an on-premise environment, fog computing environment, and/or an edge computing environment. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, IOS, Android and any other known operating system used on personal computers, central computing systems, phones, and other devices.

The user 110 can be an individual, a group, or any entity in possession of or having access to the user device, referring to either or both of the mobile device 106 and computing device 104, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

According to various embodiments, the memory device 122 and storage device 124 may be combined into a single storage medium. The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera.

Further non-limiting examples of input devices and/or output devices include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The input and output system 136 may also be configured to obtain and process various forms of authentication via an authentication system to obtain authentication information of a user 110. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

The user device, referring to either or both of the computing device 104 and the mobile device 106 may also include a positioning device 108, which can be for example a global positioning system device (GPS) configured to be used by a positioning system to determine a location of the computing device 104 or mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device (referring to either or both of the computing device 104 and the mobile device 106). As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, IOS, Android, and any known other operating system used on personal computer, central computing systems, phones, and other devices.

The user devices, referring to either or both of the computing device 104 and mobile device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

The network 258 may incorporate a cloud platform/data center that support various service models including Platform as a Service (PaaS), Infrastructure-as-a-Service (IaaS), and Software-as-a-Service (SaaS). Such service models may provide, for example, a digital platform accessible to the user device (referring to either or both of the computing device 104 and the mobile device 106). Specifically, SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device (referring to either or both of the computing device 104 and the mobile device 106), the enterprise system 200, and/or the external systems 202 and 204 are, include, or utilize virtual resources. In some cases, such virtual resources are considered cloud resources or virtual machines. The cloud computing configuration may provide an infrastructure that includes a network of interconnected nodes and provides stateless, low coupling, modularity, and semantic interoperability. Such interconnected nodes may incorporate a computer system that includes one or more processing devices, a memory device, and a bus that couples various system components (e.g., the memory) to the processing device. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

The present invention relates to a method of operating the described enterprise system 200 for interacting with a corresponding user 110 accessing a mobile banking platform associated with the enterprise system 200. As used herein, the mobile banking platform generally refers to a platform that is accessible to the user 110 via an appropriate network connection, such as a mobile banking website or a mobile banking application. If the mobile banking platform refers to a mobile banking website, the user 110 may access the website via an appropriate browser software application operating on the corresponding user device 104, 106, wherein navigation of the mobile banking website provides the user 110 access to certain data regarding the user 110 as maintained by the enterprise system 200. If the mobile banking platform refers to a mobile banking software application, the user 110 may access the mobile banking software application via the corresponding user device 104, 106 for access to the data regarding the user 110 as maintained by the enterprise system 200 in the absence of the operation of the previously described browser application. The mobile banking software application may be representative of the previously described application 132 operable on the user device 106, as one non-limiting example.

It is generally assumed hereinafter that the same features of the mobile banking platform may be accessible via use of the website accessible via the browser application or the direct use of the mobile banking software application, unless specified otherwise. It should also be generally understood that the website and the software application may generally include the display of the same data regarding the user 110, but may in some circumstances include a different arrangement of such data to best accommodate the configuration of the corresponding user device 104, 106, such as accommodating a specific screen configuration or a specific user input method. The mobile banking platform is described hereinafter as being "interacted with" by the user 110 during navigation thereof. It should be understood that such interactions may refer to any suitable interactions capable as acting as an input to the corresponding user device 104, 106, such as a corresponding touch screen interaction, mouse button click, keyboard stroke, voice activated command, or the like, as the circumstances may warrant. Such interactions are generally understood to correspond to a selection of an identifiable area of the display of the mobile banking platform, such as corresponding to a specific image, video display, text, or other representation of data, which in turn redirects the platform to change the data instantaneously displayed to the user 110 via a reconfiguration of the corresponding graphical user interface.

The mobile banking platform is shown and described hereinafter with reference to the navigation of a dedicated mobile banking software application 132 as may be executed on the user device 106 having the described display 140 acting as the graphical user interface thereof. However, as described above, it should be readily apparent that the same features may be applied to the corresponding software application or browser application during use of the user device 104 and any associated input or output devices thereof.

As mentioned hereinabove, each of the users 110 described herein may be a person or entity acting as a customer or client of the enterprise system 200 that utilizes products and/or services from the enterprise system 200 as defined herein, or may otherwise be a person or entity having an established relationship with the enterprise system 200 such that the enterprise system 200 has access to the necessary personal data regarding each of the participating users 110 for making the determinations described hereinafter. The relationship present between the enterprise system 200 and a corresponding user 110 may include the user 110 having a user account with the enterprise system 200 wherein certain actions of the user 110, actions of the enterprise system 200, and/or interactions between the enterprise system 200 and the user 110 may be monitored and recorded by the computing system 206 of the enterprise system 200. Such data of each of the users 110 of the enterprise system 200 may be in the form of the data 234 stored to the storage device 224 of the computing system 206 as utilized for carrying out the functions of the mobile banking platform as described herein. The data 234 may originate from various different sources including the recorded interactions of the user 110 with the enterprise system 200 and/or the recorded interactions of the user 110 with one or more third-party and external sources or systems, which may be representative of the previously disclosed external systems 202, 204.

The user account of each corresponding user 110 may refer to a primary or umbrella account of the user 110 from which data corresponding to various additional or subaccounts is accessible during navigation of the mobile banking platform. For example, upon providing the necessary login credentials to access the corresponding user account via the mobile banking platform, the logged-in user 110 may then be able to access each of a variety of different financial accounts maintained by the enterprise system 200 and associated with the user 110. As one non-limiting example, the user account of the user 110 may include access to each of a checking account, a savings account, and a credit card account, each of which is maintained or monitored in some form by the enterprise system 200 and associated with the user 110. However, the user account may include access to any form of financial account including a record of financial transactions associated with the financial account, such as debits, credits, or transfers between accounts, among other possible transactions. Each transaction of a corresponding financial account may be associated with certain data, such as a corresponding monetary amount and/or date of transaction, by which such transactions may be appropriately categorized or otherwise sorted.

The personal data accessible to the enterprise system 200 regarding the user 110 may include data regarding products and/or services offered to the user 110 by the enterprise system 200 relating to banking, checking, savings, investments, credit cards, automatic-teller machines, debit cards, loans, mortgages, personal accounts, business accounts, account management, credit reporting, credit requests, and credit scores, as non-limiting examples. The data may further include files such as those for user accounts, user profiles, user account balances, user transaction histories, user investment portfolios, past communications with the user, or files downloaded or received from other devices such as the user devices 104, 106 of the user 110.

The present invention described hereinafter may utilize data sets associated with the users 110 of the enterprise system 200. Each of the users 110 may be a person or entity acting as a customer or client of the enterprise system 200 that utilizes products and/or services originating at least in part from the enterprise system 200 as defined herein, or may otherwise be a person or entity having an established relationship with the enterprise system 200 such that the enterprise system 200 has access to the necessary personal data regarding each of the participating users 110 for making the determinations described hereinafter. The relationship present between the enterprise system 200 and each of the users 110 may include one or more of the users 110 having an account with the enterprise system 200 wherein certain interactions between the enterprise system 200 and each of the users 110 may be monitored and recorded by the computing system 206, as described in greater detail herein. Alternatively, if not already customers or clients, one or more of the users 110 may be representative of persons or entities that are considered to be potential or prospective customers or clients, such as those persons or entities for which the computing system 206 has the necessary data allowing for the enterprise system 200 to identify and then communicate with the corresponding person or entity to tender such products and/or services.

The personal data of each of the users 110 of the enterprise system 200 may be in the form of the data 234 stored to the storage device 224 of the computing system 206. The data 234 may originate from various different sources including the responses of the user 110 to queries from the enterprise system 200, the recorded interactions of the user 110 with the enterprise system 200, or one or more third-party and external sources or systems, which may be representative of the previously disclosed external systems 202, 204.

The present invention may also rely upon the enterprise system 200 having access to the personal data associated with each associated user 110. In some embodiments, the invention may be carried out with respect to the user 110 having an established account with the enterprise system 200, wherein the establishment of an account may include the user 110 providing at least some of the entries of the associated personal data to the enterprise system 200. The enterprise system 200 may collect data regarding the user 110 by directly querying and recording the responses of the user 110. Such data may be entered via use of the web browser application or software application 132 associated with the enterprise system 200, and such information may be entered by the user 110 via use of the user device (referring to either or both of the computing device 104 and a mobile device 106) executing the corresponding application 132. The data provided to the enterprise system 200 regarding the user 110 may include, as non-limiting examples, the gender, age, income level, employment status, home ownership status, marital status, citizenship status, etc. of the user 110. Any available demographic data regarding the user 110 may form a portion of the personal data with respect to the user 110.

When the enterprise system 200 is representative of a financial institution or mobile banking system, the personal data accessible to the enterprise system 200 regarding the user 100 may include data regarding products and/or services tendered to the user 110 by the enterprise system 200 relating to banking, checking, savings, investments, credit cards, automatic-teller machines, debit cards, loans, mortgages, personal accounts, business accounts, account management, credit reporting, credit requests, and credit scores, as non-limiting examples. The data may further include files such as those for user accounts, user profiles, user account balances, user transaction histories, user investment portfolios, past communications with the user, or files downloaded or received from other devices such as the user device (referring to either or both of the computing device 104 and a mobile device 106) of the user 110.

In some circumstances, such as when the enterprise system 200 is representative of a financial institution or mobile banking system tendering typical banking services and products, the enterprise system 200 may have access to data regarding the transactions of the user 110 as facilitated by the enterprise system 200. For example, transaction histories regarding purchases carried out via a credit card or debit card associated with the enterprise system 200 may be accessible to the computing system 206, as well as current or prior account balances of such accounts.

The enterprise system 200 may also be configured to monitor and record specific interactions of the user 110 with the enterprise system 200 in attaining additional data regarding the user 110. For example, in the event that the user 110 has an account with the enterprise system 200, the user 110 may be required to provide authentication data to the web browser application or software application 132 associated with the enterprise system 200. Following such a login process, the enterprise system 200 may monitor and record the interactions of the identified user 110 with the interface of the corresponding application 132 in order to accumulate data associated with the user 110. For example, the enterprise system 200 may monitor data such as the number of logins to the account of the user 110 in a specified period of time, the frequency of the logins of the user 110, the duration of time the user 110 remains logged into the application 132 (while remaining active), and the types of products and/or services interacted with and/or purchased by the user 110 via navigation of the corresponding application 132. Data may also be recorded regarding the navigation of the application 132, such as recording which resources the user 110 has accessed, how long such resources were accessed, or the like, such as referencing which web addresses associated with the application 132 have been accessed by the user 110 or which files related to the application 132 have been accessed by the user 110.

The personal data regarding the user 110 may also include data relating to the account settings of the user 110 as established with respect to the computing system 206. Such account setting data may be stored to the storage device 224 of the computing system 206 and may be associated with determining how the computing system 206 interacts with the user 110 via the user device (referring to either or both of the computing device 104 and a mobile device 106). For example, such account setting data may include data relating to the frequency of communications sent from the computing system 206 to the user 110 for access via the user device (referring to either or both of the computing device 104 and a mobile device 106), under what conditions to communicate with the user 110, the content of such communications, the types or forms of such communications, the manner in which the interface of the web browser application or software application 132 displays information to the user 110, or the information or resources accessible to the user 110 via navigation of the web browser application or software application 132, as non-limiting examples.

In other circumstances, the personal data may be representative of data acquired regarding the user 110 during web related activities, such as tracking a web browsing history of the user 110, as may be provided by "cookies" or similar tools, or tracking certain communications of the user 110, such as monitoring certain aspects of the email activity of the user 110. If web related activities are monitored, such data may correspond to the activities of the user 110 with respect to the webpage or software application 132 associated with the enterprise system 200 or may relate to the activities of the user 110 with respect to third party applications or websites. Such data may be communicated from the user device (referring to either or both of the computing device 104 and a mobile device 106) used to perform the web browsing to the computing system 206 for storage to the storage device 224 as a form of the data 234.

The enterprise system 200 may also utilize data originating from one of the external systems 202, 204, which may be representative of personal data accumulated with respect to the user 110 external to the enterprise system 200 that is available to or otherwise accessible by the computing system 206 via interaction with one or more of the external systems 202, 204. The external systems 202, 204 may accordingly be representative of third-party data providers configured to communicate data to the computing system 206 regarding the user 110. Such data may include a credit history of the user 110 or transactions of the user 110 with respect to other business entities, as may originate from sources others than the enterprise system 200. Further examples include data originating from third party social networks or the like, such as check-ins at certain establishments, social connections to other users, posting or commenting histories, or interactions with certain other users or business entities. Data regarding a transaction history of the user 110, whether derived from the relationship between the user 110 and the enterprise system 200 or the user 110 and a third party external system 202, 204, may include data regarding the establishments at which the user 110 has made the purchases, the amounts of such purchases, and potentially additional information regarding the products and/or services related to such purchases. Such data may be available via records of the credit or debit purchases made by the user with respect to certain establishments as monitored by the third party external systems 202, 204.

The personal data collected with respect to each user 110 may be categorized as demographic data regarding the user 110, behavioral data regarding the activities of the user 110, and behavioral data regarding the activities of the enterprise system 200 with respect to the user 110 (such as data relating to communications from the enterprise system 200 to the user 110 regarding educational materials or data relating to tenders for the purchase of products and/or services). The demographic data generally refers to the data regarding the user 110 that corresponds to a trait or characteristic of the user 110 by which the user 110 may be categorized or classified, whereas the behavioral data generally refers to data regarding the recordation of information regarding the actions of the user 110, the actions of the enterprise system 200, or past interactions or transactions occurring between the enterprise system 200 and the user 110.

The personal data associated with at least some of the users 110 may also include at least one entry of response data, wherein such response data may refer to data regarding the response(s) of the participating users 110 of the enterprise system 200 to one or more queries. Each of the users 110 may be alternatively referred to as a respondent of one or more of the queries when discussing the querying process hereinafter. The response data may be available for only some of the plurality of the users 110 of the enterprise system 200, depending on the responsiveness of such users 110 to such queries or the distribution of such queries being posed to the plurality of the users 110. As used herein, a query may refer to any question answered by a respondent for the purpose of collecting data regarding the opinions, feelings, thoughts, beliefs, impressions, predictions, and/or observations of the respondent. The response data may be accumulated using any known method so long as the response data is recorded in a form configured for use with the computing system 206 and the corresponding machine learning model executed thereon. In some embodiments, the querying of each of the users 110 may be conducted online via the web browser or software application 132 corresponding to the enterprise system 200 as operating on the user device (referring to either or both of the computing device 104 and a mobile device 106) of the respondent user 110, as explained in greater detail hereinafter.

Each of the queries may be linked to a corresponding campaign as tendered by the enterprise system 200 or an affiliate thereof, hence the users 110 having provided such responses may be indicative of those users 110 having participated in such campaigns. In some circumstances, the corresponding campaign has some connection or relationship to a specific topic and/or event. Such a relationship may be utilized in the campaign or may include an object of the campaign having a specific relationship to the topic in question. The manner in which the campaign and/or the object of the campaign is related to a specific topic may aid in providing increased engagement of each participating user 110 by relating to a topic of interest to the user 110, or to a topic of perceived knowledge of the user 110. Such increased engagement may lead to an increased likelihood of participation in the corresponding campaign, and hence access to the query or queries associated with such campaign.

The queries may include content that directly or indirectly relates to the topic of the materials and/or an object of the campaign. For example, if an object such a credit card is being tendered as the object of the campaign, the queries related to the corresponding campaign may relate to whether or not the participating user 110 has a credit card, is satisfied with said credit card, or has an interest in changing said credit card. As another example, relating to the credit card as the object of the campaign may relate to whether or not the participating user 110 desires an opening card bonus, a certain annual percentage rate (APR), a balance transfer, a percentage back, or lines of credit. As yet another example relating to the credit card as the object of the campaign, the query may relate to what products and/or services the user 110 would purchase with the credit card and/or would purchase if not responsible for a monthly credit card payment. The query may include the user 110 providing a preference for and/or an interest in one or more products and/or services tendered by the enterprise system 200.

The queries may alternatively relate to collecting or updating certain demographic or behavioral data regarding the user 110 that has otherwise been unable to be collected/updated. Such responses may accordingly aid in providing further correlations to similar users 110 by expanding the data set upon which correlations can be discovered and implemented.

The queries may directly relate to the preferences of the user 110 regarding certain account settings or other interactions with the computing system 206 and/or enterprise system 200. For example, a query may request the impressions of the user 110 on the performance of the enterprise system 200 in meeting the needs of the user 110 with respect to certain products and/or services tendered by the enterprise system 200. As another example, a query may relate to the preferences of the user 110 regarding the number, form, and content of certain communications sent to the user 110 by the computing system 206 as may be represented in the account settings of the user 110, such as a preference for paperless communication.

The queries are not necessarily limited to being associated with a specific campaign or topic of interest. In some circumstances, the queries may be associated with a survey proactively tendered to at least some of the users 110 for attaining additional personal data regarding any of the disclosed forms of personal data herein.

Although the response data has been described as originating from the interactions between the user 110 and the computing system 206 of the enterprise system 200, the response data may originate from any source without necessarily departing from the scope of the present invention. In some embodiments, the querying is conducted by the enterprise system 200 according to any of the processes discussed above, and the resulting response data is stored to the storage device 224 as one form of the data 234 associated therewith. In other embodiments, the response data is accumulated by a third party associated with the campaign and/or corresponding survey (or the like), and the resulting response data is communicated to the storage device 224 for storage as a form of the data 234. The third party conducting the querying and accumulating the response data may be representative of one of the external systems 202, 204 shown and described as being in communication with the computing system 206 with reference to FIG. 1. In such a circumstance, the user device (referring to either or both of the computing device 104 and a mobile device 106) of the user 110 may be utilized to respond to the queries via the web browser application or via a software application associated with the third party external system 202, 204 responsible for making the queries, and such data may be communicated from the external system 202, 204 to the computing system 206 by any known method, or may alternatively be communicated directly from the user device (referring to either or both of the computing device 104 and a mobile device 106) to the computing system 206, as desired.

The response data associated with each individual user 110, which may be a subset of the personal data of that same user 110, may include a data entry with respect to each query asked of and answered by the user 110. In some circumstances, only a single query or single set of queries asked substantially contemporaneously may form the response data of the user 110, whereas in other circumstances, the user 110 may include response data entries with respect to a plurality of independently conducted campaigns/surveys, each of which may be associated with one or more response data entries, depending on the format of the campaign/survey and the types of queries posed. Accordingly, the personal data associated with any individual user 110 may include entries of any of the different types of data disclosed hereinabove, including entries relating to demographic data, behavioral data, and response data. Each entry of the personal data may be representative of one of the demographic traits of the user 110, one of the behavioral traits of the user 110, one of the behavioral traits of the computing system 206, or one of the responses of the user 110 to a corresponding query. The number or types of entries available in the personal data may vary among users 110 depending on the relationship to the enterprise system 200 and the availability of such data, as well as the participation of such users 110 in responding to such queries as a result of participation in the corresponding campaign/survey. Some entries of the personal data of some users 110 may accordingly be empty or may include assumed or predicted data, as desired, when utilized by a machine learning model.

As used in various examples hereinafter, the personal data of at least one of the users 110 may include at least one data entry related to a past purchase or an ongoing use (active status) of a product and/or service by the user 110 as tendered by the enterprise system 200, or to the lack of the purchase or use of such a product and/or service by the user 110. The personal data of at least one of the users 110 may also include at least one data entry related to the frequency of use or manner of use of a certain product and/or service provided by the enterprise system 200 for use by the user 110. The product and/or service for which the frequency or classification of use is collected may correspond to the previously mentioned product and/or service for which the data regarding the past purchase or ongoing use is collected. For example, if the user 110 has an established credit card account with the enterprise system 200, the personal data of the user 110 may include a data entry relating to the active status of the credit card account (thereby indicating the past purchase or ongoing use thereof), a data entry relating to the frequency of use of the credit card account, and at least one data entry relating to the types or amounts of the transactions carried out with the credit card account. The personal data of the user 110 may also include data entries relating to the lack of purchase and/or use of other products and/or services also provided by the enterprise system 200, such as alternative financial products and/or services that the user 110 is not currently utilizing. The personal data of the user 110 may also, where applicable, include data entries relating to the purchase and/or use of products and/or services provided by a third-party entity, such as entities representative of competitors to the enterprise system 200. For example, the personal data may include data entries that indicate the presence of other credit card accounts associated with the user 110 with respect to third-party financial institutions and any available data regarding the frequency or manner of use of such third-party credit card accounts. As evidenced by the examples set forth hereinafter, it should be appreciated that the personal data associated with each of the users 110 may include any combination of the data described as being available to the computing system 206 herein while remaining within the scope of the present invention.

Figure 2:
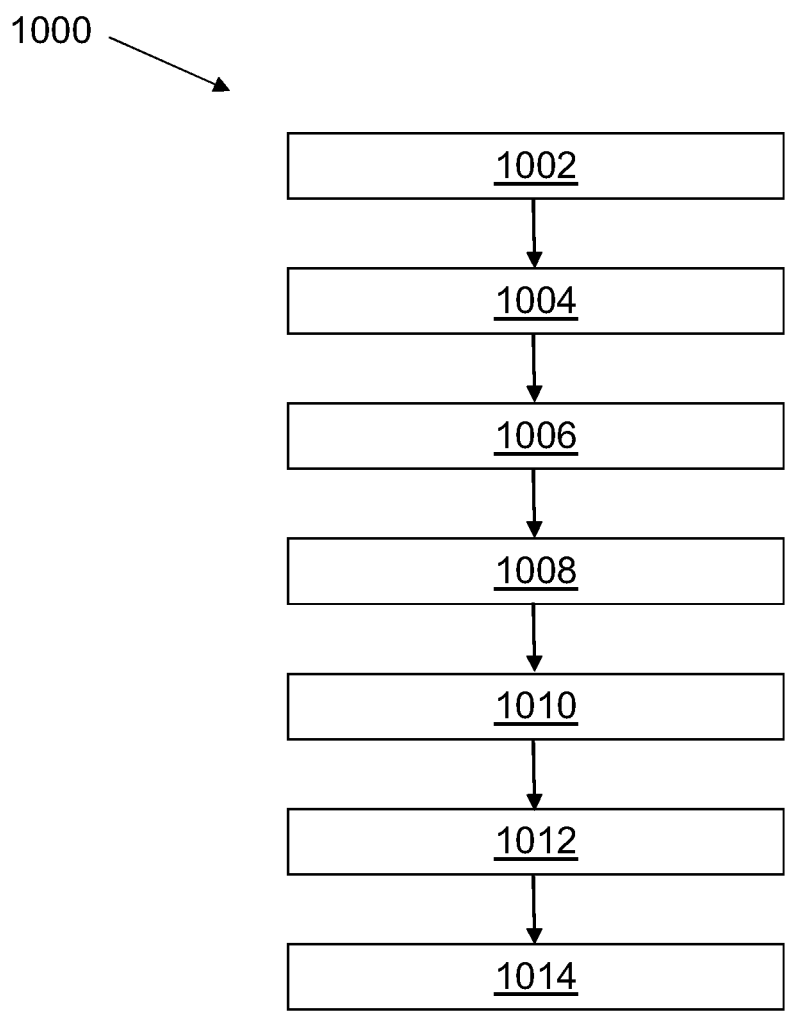
FIG. 2 depicts a flow diagram of a method for improving network efficiency using targeted action selection in accordance with an embodiment of the present disclosure.

FIG. 2 illustrates a method 1000 for selecting targeted actions of the enterprise system 200 in accordance with an embodiment of the present disclosure. The method includes an initial step 1002 of providing or permitting access to the personal data of the user 110. In some embodiments, the personal data of the user 110 may be created by querying a single user 110 or a plurality of the users 110 for attaining one or more responses forming response data entries. As mentioned above, the querying may be conducted directly by the enterprise system 200 or by a third party external source 202, 204, and may be initiated at the request of the user 110 via participation in an organized campaign, the enterprise system 200 via a corresponding communication or request, or the third party external source 202, 204. In some embodiments, the user 110 utilizes the web or software application 132 associated with the enterprise system 200 to conduct the process of responding to a specific query.

In some circumstances, the campaign may be made known to each of the users 110 via an appropriate communication or advertisement, which may be made available via email, radio, television, social media, print and online platforms, multimedia, push notification, and/or display via the graphical user interface (GUI) of the user device (referring to either or both of the computing device 104 and a mobile device 106), as non-limiting examples. Upon determining to participate in such a campaign, the user 110 may be queried during a process of enrolling in the campaign, and such query make take any of the forms described herein and may be directed towards any of the different subject matters described herein. The querying may include multiple queries being asked substantially contemporaneously, wherein each response is stored as an individual entry of the response data corresponding to that user 110. The completion of one or more of the queries may be made a term for eligibility in the underlying campaign to ensure participation in responding to such queries when posed. For example, providing responses to the queries may be necessary to continue on during the process of enrolling in the campaign, such as not progressing to the next step of the enrollment process unless such queries are addressed appropriately in accordance with the terms of the campaign.

In some circumstances, the campaign may include multiple different stages or periods of engagement or interaction with the user 110. For example, the campaign may require periodic or continued interaction from the user 110 as conditions change depending on the format of the campaign. Such campaigns may also include features wherein the user 110 may desire to login to the account of the user 110 via the web or software application 132 to track the progress of the user 110. Each of the these continued engagements or interactions with the user 110 may be utilized as opportunities for the computing system 206 to further query the user 110, hence some campaigns may be associated with multiple different instances of the queries being posed to a specific user 110, and hence multiple different queries or sets of queries.

In some other embodiments, the queries may not be linked directly to a campaign and may instead be utilized with respect to alternative interactions occurring between the computing system 206 and the user device (referring to either or both of the computing device 104 and a mobile device 106) of the user 110. For example, such queries may be posed to the user 110 when navigating the web or software application 132 associated with the enterprise system 200, such as when certain resources are accessed, or when the user 110 first logs into the corresponding account. In some circumstances, such queries may be related to the topic or content accessed by the user 110, such as posing a query regarding the impressions of the user 110 regarding certain financial instruments when the user 110 has accessed educational materials regarding such financial instruments while navigating the interface of the web or software application 132. Such queries may form a portion of a survey provided by the enterprise system 200 for completion by the user 110, which may include a series of queries of related or unrelated content. The use of a survey may include a prompt for completion of the survey to be automatically and proactively displayed to the user 110, such as via the graphical user interface (GUI) of the display 140 of one of the user devices (referring to either or both of the computing device 104 and a mobile device 106) during navigation of the web or software application 132, in order to increase participation in said survey.

At step 1004, the processing device 220 transmits an electronic communication to the user device (referring to either or both of the computing device 104 and a mobile device 106). The electronic communication may be in a variety of different communication mechanisms such as a short message service (SMS) message (e.g., a text message), a flash SMS, an electronic email communication, a telephone call, for example. The electronic communication may be transmitted via the network 25 and/or using standardized communications protocols. In certain instances, the flash SMS may be a type of SMS that may appear directing on the graphical user interface (GUI) of the display 140 of the user device (referring to either or both of the computing device 104 and a mobile device 106) absent user interaction. Additionally, the flash SMS may not be stored in the user device (referring to either or both of the computing device 104 and a mobile device 106).

The electronic communication may be transmitted to any number of the users 110 and/or may correspond to the campaigns corresponding to a product and/or service tendered by the enterprise system 200 or campaigns tailored to the specific user 110 or any number of users 110. In certain embodiments, the electronic communication is related to one or more credit cards. Preferably, the one or more credit cards are being tendered as the object of the one or more organized campaigns. More preferably, the electronic communication contains product and/or service information related to a tendering of the one or more credit cards.

In some embodiments, the electronic communication may be transmitted to the user devices (referring to either or both of the computing device 104 and a mobile device 106) when the personal data of the user 110 indicates that one or more triggering conditions have occurred. As non-limiting examples of the triggering conditions, the personal data of the user 110 reflecting that the user 110 has reached a certain age, had a change in marital status, reached a certain account balance or status, had a change in home ownership status, or a change in the propensity for the user 110 to purchase or use a specific product and/or service. As another example, the triggering conditions may relate to a data entry corresponding to the recent purchase or agreement to use a specific first product and/or service as tendered by the enterprise system 200, wherein it is known that the eventual purchase of a second product and/or service as tendered by the enterprise system 200 is correlated to the purchase of the first product. As yet another example, the triggering conditions may relate to the initial entry of the response data with respect to a specific user 110 upon that user 110 responding to a corresponding query. For example, if a query directly requests a response indicating whether the user 110 has interest in purchasing a product and/or service.

The personal data specific to and accessible exclusively by the enterprise system 200 may be utilized in determining the triggering conditions. Such personal data may be acquired as a result of the organized campaign and/or the relationship present between the enterprise system 200 and the user 110. For example, if the enterprise system 200 is a financial institution having access to account records, the triggering condition may relate to a certain balance being reached within one of the accounts of the user 110, or to a failure of the user 110 to make a scheduled payment on a debt managed by the enterprise system 200, or the like. Such personal data may accordingly refer specifically to interactions between the user 110 and the enterprise system 200 as a part of the campaign and/or the relationship present between the user 110 and the enterprise system 200, including data regarding past transactions of the user 110 as initiated by the enterprise system 200 or transactions occurring directly between the user 110 and the enterprise system 200. For example, the enterprise system 200 may utilize data regarding purchases of the user 110 made with entities other than the enterprise system 200 (where such data is available, such as where a financial instrument such as a credit card or debit card associated with the enterprise system 200 is used in making these purchases) or data regarding transactions including payments, agreements, or other contractual obligations made directly between the user 110 and the enterprise system 200 with regards to a product and/or service tendered by the enterprise system 200.

Such personal data may also include data collected by the enterprise system 200 from a third party source where the user 110 has provided express consent for such data to be shared with or otherwise accessible to the enterprise system 200, such as data regarding transactions occurring between the user 110 and entities external to the enterprise system 200 that are not otherwise monitored directly by the enterprise system 200. For example, the enterprise system 200 may have access to personal data regarding transactions occurring with respect to a credit card or debit card of the user 110 associated with and/or managed by a financial institution other than the enterprise system 200, hence such personal data must be communicated to the enterprise system 200 for access thereto in determining the triggering conditions.

The enterprise system 200 may also utilize personal data collected with respect to the user 110 regarding the interactions of the user 110 with the enterprise system 200 via the corresponding web browser application or software application 132 associated with the enterprise system 200. For example, navigating of the application 132 may include the user 110 reviewing information relating to certain products and/or services tendered by the enterprise system 200, or making a selection that additional information is requested with respect to a topic related to one of the queries. Similar data may be collected regarding the organized campaigns and/or alternative interactions, such as whether or not the specific user 110 views or responds to email messages, text messages, or the like, as applicable. The determination of the triggering conditions based on such interactions may aid in proactively assessing the user 110 and providing the electronic communication, such as prompting the enterprise system 200 to transmit the electronic communication when it has been determined that certain products and/or services have been reviewed by the user 110 in conjunction with the data profile of the user 110, thereby indicating a need of the user 110 to receive the electronic communication.

The triggering conditions indicated above may also be complex in nature and may include reference to multiple different variables of the personal data of the user 110 or multiple conditional relationships therebetween. As one example, upon determining that the age of the user 110 has surpassed a certain threshold, an additional variable of the personal data of the user 110, such as the balance of a savings account of the user 110 accessible to the enterprise system 200, may be utilized in determining whether the triggering condition has occurred and whether the electronic communication is to be transmitted to the user 110. Specifically, with respect to the given example, the triggering conditions of the enterprise system 200 that the electronic communication be transmitted to the user 110 may include the determination being made only if the age of the user 110 meets or exceeds the established threshold and the data regarding the account balance also meets or exceeds the established threshold. It should also be appreciated that the electronic communication may be transmitted to the user 110 based on any combination of any of the above described conditions or events, as desired.

In some embodiments, the computing system 206 of the enterprise system 200 may continuously determine and transmit the electronic communication to the user 110 whenever additional personal data is acquired by the computing system 206 regarding the user 110, whether derived from an interaction between the user 110 and the enterprise system 200 or acquired by the enterprise system 200 from a third party source 202, 204. This allows the electronic communication transmitted with respect to any one user 110 to always be as up to date as possible.

With continued reference to FIG. 2, the processing device 220, at step 1006, displays the electronic communication on the graphical user interface (GUI) of the user device (referring to either or both of the computing device 104 and a mobile device 106). In certain embodiments, the electronic communication includes a user selectable mechanism 148 displayed on the graphical user interface (GUI) of the user device (referring to either or both of the computing device 104 and a mobile device 106). In other embodiments, the user selectable mechanism 148 may be accessible by the user 110, via the GUI, without receipt of the electronic communication or any other type of notification or communication.

The user selectable mechanism 148 may be configured to be engaged by the user 110. For example, the user selectable mechanism 148 may be a graphical control element that allows the user 110 to choose one or more predefined options. Various types of graphical control elements may be employed such as a button, a checkbox, a dropdown list, and the like, for example. The user selectable mechanism 148 may also be configured to be selected by direct contact of the user 110 such as by a user "pressing" on the graphical user interface (GUI) of the user device (referring to either or both of the computing device 104 and a mobile device 106). In some embodiments, the user selectable mechanism 148 may further include corresponding text and/or icons (e.g., "Opt-in", "Opt-out", "Contact me", etc.) to provide direction and/or clarification to the user 110 of the functionality of the user selectable mechanism 148.

In preferred embodiments, the user selectable mechanism 148 may be configured to permit the user 110 to select targeted actions from the enterprise system 200. In some circumstances, the user selectable mechanism 148 may permit the users 110 to select at least one targeted action such as opting-in or opting-out of specific individual campaigns. Various credit card campaigns may include, but are not limited to, an opening bonus offer, an annual percentage rate (APR) offer, a balance transfer offer, a percentage back, lines of credit, and the like. The campaigns, however, are not limited to credit card campaigns, but may also include campaigns related to mortgages and other products and/or services tendered by the enterprise system 200. In the instance that the user 110 opts-in to certain campaigns, the user selectable mechanism 148 may also permit the user 110 to select specific methods of communication from the enterprise system 200 such as U.S. mail, electronic mail, text message, push notification, human communication, and/or direct communication from at least one agent 210, for example.

At step 1008, upon the user selectable mechanism 148 being engaged by the user 110, a communication related to the at least one targeted action may be transmitted, via the network, from the at least one user device (referring to either or both of the computing device 104 and a mobile device 106) to the enterprise system 200. In some embodiments, the communication related to the at least one targeted action includes personal data of the user 110 which may be used by the enterprise system 200 to identify the specific user 110 from which the at least one targeted action originated. At step 1010, the processing device 220 receives the communication related to the at least one targeted action.

Subsequently at step 1012, upon receipt of the communication related to the at least one targeted action from the at least one user device (referring to either or both of the computing device 104 and a mobile device 106), the processing device 220 may transmit an electronic notification to at least one agent 210 to initiate the at least one targeted action. Alternatively, the communication related to the at least one targeted action, received via the network, from the at least one user device (referring to either or both of the computing device 104 and a mobile device 106), may be directly transmitted to at least one agent 210 by the processing device 220 without the need for the electronic notification. In yet another embodiment, the processing device 220 of the enterprise system 200 may directly initiate the at least one targeted action without any communication and/or involvement of the at least one agent 210.

The communication related to the at least one targeted action and/or the electronic notification transmitted to the at least one agent 210 from the processing device 220, may occur using any known communication and/or transmission method. For example, an email, text message, push notification, or the like may be generated by the computing system 206 for communication to the at least one agent 210. Such a communication may be communicated from the computing system 206 to the agent device 212 of the at least one agent 210 using any of the methods described hereinabove in describing the communication capabilities of the device 212 and systems 200, 206 within FIG. 1. The at least one agent 210 may then review such a communication via interaction with the corresponding agent device 212, which provides a perceptible expression of the content of the communication. Such a perceptible expression of the content of the communication may be visually perceptible, such as in the form of readable text able to be displayed on the agent device 212, or audibly perceptible, such as in the form of an audio file able to be played by the agent device 212. The display and/or speaker of the agent device 212 may be utilized in perceiving the content of the communication.

At step 1014, the at least one agent 210 and/or the processing device 220 of the enterprise system 200 initiates the at least one targeted action with the user 110. One potential targeted action may include the agent 210 and/or other various processes or parts of the enterprise system 200 (e.g., the computing system 206) tendering products and/or services to the user 110 in reaction to the specific campaign selected by the user 110. The described tender of products and/or services from the agent 210 and/or the other various processes or parts of enterprise system 200 may take many different forms. In some circumstances, the tender may constitute a tender of educational materials or advertising materials regarding a specific product and/or service for which the user 110 is determined to have a propensity to purchase or use, as revealed by the at least one targeted action associated with a corresponding user 110. Such an interaction may, in the case of educational materials, include a communication from the agent 210 and/or the other various processes or parts of enterprise system 200 to the user device 104, 106 of the user 110, such as by an email, text message, or push notification, as non-limiting examples. Such educational materials may additionally or alternatively be made available by the agent 210 and/or the other various processes or parts of the enterprise system 200 for access via the account of the corresponding user 110 when accessing the web browser application or software application 132 corresponding to the enterprise system 200.

In other circumstances, the targeted action may be the agent 210 and/or the other various processes or parts of the enterprise system 200 sending a communication to the user device 104, 106 including a direct tender for the product and/or service to be purchased by the user 110 or otherwise provided by the enterprise system 200 to the user 110 by express agreement. For example, the communication to the user 110 may include a tender to purchase an investment related product and/or service from the enterprise system 200, or may include a tender for the enterprise system 200 to tender periodic advise to the user 110 regarding topics such as long-term planning as provided by an agent 210. Such communication from agent 210 and/or the other various processes or parts of the enterprise system 200 to the user device 104, 106 may include information for redirecting the user device 104, 106, such as may occur via use of the appropriate web browser application or software application 132, to an appropriate interface for completing the purchase of the product and/or service, as may be accessible via the application 132.

In some circumstances, the communication from the agent 210 and/or the other various processes or parts of the enterprise system 200 to the user 110 may also include a reference to the personal data of the corresponding user 110 for prepopulating data related to the purchase of the product and/or service. For example, if the process of completing the purchase of the product and/or service includes the user 110 entering information into an interface provided by the webpage or application 132, the personal data of the user 110 as known by the computing system 206 may be utilized to automatically prepopulate any fields of the purchase process to which the personal data corresponds. As another example, the purchase of some products and/or services may require documents to be populated with such personal data, hence the enterprise system 200 may be configured to automatically prepopulate such documents prior to communicating such documents to the user 110. Such documents may comprise transferable files of any desired type compatible with each of the associated devices or computing systems 104, 106, 206.

The agent 210 and/or the other various processes or parts of the enterprise system 200 may, according to the communication related to the at least one targeted action, initiate targeted actions that utilize the computing system 206 to alter the account settings of the user 110 to change a manner in which the agent 210 and/or the other various processes or parts of the enterprise system 200 interacts with the user 110 via the corresponding user device 104, 106. For example, such account setting changes may include changing the settings relating to the frequency of communications sent from the agent 210 and/or the other various processes or parts of the enterprise system 200 to the user 110 for access via the user device 104, 106, under what conditions to communicate with the user 110, the content of such communications, the types or forms of such communications (such as paperless communication), the manner in which the interface of the web browser application or software application 132 displays information to the user 110, or the information or resources accessible to the user 110 via navigation of the web browser application or software application 132, as non-limiting examples. The changing of the account settings may refer to the agent 210 and/or the other various processes or parts of the enterprise system 200 altering the account related data stored as a form of the data 234 associated with the storage device 224, which in turn results in a reconfiguring of the operation of the agent device 212 and/or the other various processes or parts of the enterprise system 200 with regards to how the agent device 212 and/or the other various processes or parts of the enterprise system 200 subsequently interacts with the user device 104, 106 with respect to at least one variable.

The use of the electronic communication with the user selectable mechanism 148 to initiate the at least one targeted action from at least one agent 210 and/or the other various processes or parts of the enterprise system 200 improves the efficiency of the agents 210 and operation of the computing system 206 and the enterprise system 200 in various different respects. First, the disclosed method provides an ability for the agents 210 to eliminate unnecessary communications relating to certain tasks performed by the agent 210 and/or the other various processes or parts of the enterprise system 200 that have been found to not have a positive impact on securing the desired product and/or service from the user 110. For example, the agents 210 and/or the other various processes or parts of the enterprise system 200 may avoid a waste of time and resources when performing certain tasks, such as sending unnecessary communications of various forms to users 110 that will never interact with or benefit from the sending of such communications. The user selectable mechanism 148 provides the agents 210 and/or the other various processes or parts of the enterprise system 200 greater insight to determine other related actions to take that may increase the probability of the completion of a sale or the like with respect to a specific product and/or service, or in improving the preference of the user 110 with respect to a desired account setting. Each of the described advantages leads to a reduction in network traffic as experienced by the other various processes or parts of the enterprise system 200, including but not limited to the computing system 206, due to the ability to identify those communications that have a higher probability of having a positive impact on the engagement with the users 110.

Aspects of the present disclosure are described herein with reference to flowchart illustrations and/or block diagrams of computer-implemented methods and computing systems according to embodiments of the subject matter. It will be understood that each block of the flowchart illustrations and/or block diagrams, and combinations of blocks in the flowchart illustrations and/or block diagrams, can be implemented by computer readable program instructions that may be provided to a processing device of a general purpose computer, special purpose computer, or other programmable data processing apparatus (the term "apparatus" includes systems and computer program products). The processing device may execute the computer readable program instructions thereby creating a means for implementing the actions specified in the flowchart illustrations and/or block diagrams. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the actions specified in the flowchart illustrations and/or block diagrams. In particular, the computer readable program instructions may be used to produce a computer-implemented method by executing the instructions to implement the actions specified in the flowchart illustrations and/or block diagrams.

The computer program instructions may also be stored in a computer-readable memory device that can direct a computer or other programmable data processing apparatus to function in a particular manner, such that the instructions stored in the computer readable memory device produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the disclosure.

In the flowchart illustrations and/or block diagrams disclosed herein, each block in the flowchart/diagrams may represent a module, segment, or portion of instructions, which comprises one or more executable instructions for implementing the specified logical function(s). In some implementations, the functions noted in the blocks may occur out of the order noted in the Figures. For example, two blocks shown in succession may, in fact, be executed substantially concurrently, or the blocks may sometimes be executed in the reverse order, depending upon the functionality involved.

Computer program instructions are configured to carry out operations of the present disclosure and may be or may incorporate assembler instructions, instruction-set-architecture (ISA) instructions, machine instructions, machine dependent instructions, microcode, firmware instructions, state-setting data, source code, and/or object code written in any combination of one or more programming languages.

An application program may be deployed by providing computer infrastructure operable to perform one or more embodiments disclosed herein by integrating computer readable code into a computing system thereby performing the computer-implemented methods disclosed herein.

Although various computing environments are described above, these are only examples that can be used to incorporate and use one or more embodiments. Many variations are possible.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present disclosure has been presented for purposes of illustration and description, but is not intended to be exhaustive or limited to the subject matter in the form disclosed. Many modifications and variations will be apparent to those of ordinary skill in the art without departing from the scope and spirit of the subject matter. The embodiment was chosen and described in order to best explain the principles of one or more aspects of the disclosure and the practical application, and to enable others of ordinary skill in the art to understand one or more aspects of the disclosure for various embodiments with various modifications as are suited to the particular use contemplated.

I claim:

1. A system for improving network efficiency of a financial institution using targeted action selection, the system comprising:
   an agent device of the financial institution configured to wirelessly communication with at least one user device, wherein the agent device is configured to execute a software application;
   a computing system with at least one processing device and at least one memory device, wherein the computing system executes computer-readable instructions; and
   a network connection operatively connecting the agent device, the at least one user device, and the computing system, the network connection configured to permit network data flow between the agent device, the at least one user device, and the computing system;
   wherein, upon execution of the computer-readable instructions, the computing system is configured to:
      initiate a machine learning program to predict at least one targeted action that can be communicated through digital communication and has an increased likelihood of user engagement;
      deploy the machine learning program as a predictive model;
      initiate providing, via a graphical user interface of the at least one user device, a user software application to a user for installation on the at least one user device, wherein the at least one user device is configured to wirelessly communicate with the computing system via the user software application;
      receive, via the user software application installed on the at least one user device, personal data of the user, wherein the personal data includes one or more credit card transactions between the user and the financial institution and one or more credit card transactions between the user and one or more financial entities external to the financial institution;
      generate a personal data set based upon the personal data of the user, the personal data set comprising data relating to responses to queries, where the queries are posed to the user by the computing system and linked to a particular topic, where the particular topic is included as part of an organized credit card campaign of the financial institution, wherein a completion of the queries is a term for user eligibility in the organized credit card campaign;
      apply the personal data set of the user to the predictive model;
      identify, based on applying the personal data set to the predictive model, at least one user-specific targeted action related to a plurality of the organized credit card campaigns of the financial institution predicted to have an increased probability of positive engagement with the user such that digital communications transmitted to the user device are more user-specific;
      determine, based on the personal data set, an occurrence of at least one triggering condition, wherein the at least one triggering condition relates to one or more credit card transactions between the user and the financial institution and one or more credit card transactions between the user and the one or more financial entities external to the financial institution;
      determine, based on the personal data set, whether one of more variables of the personal data of the user meets specific criteria set by the system, wherein the specific criteria includes exceeding one or more established thresholds;
      transmit, via the network connection, a communication including the at least one user-specific targeted action related to the organized credit card campaigns to the at least one user device, wherein the communication includes a user selectable mechanism for the user to select one or more predefined options associated with the at least one user-specific targeted action related to the organized credit card campaigns, wherein the at least one triggering condition causes the communication including the at least one user-specific targeted action and the user selectable mechanism to be provided to the at least user device when the specific criteria for the one or more variables of the personal data of the user is satisfied, and wherein the predefined options associated with the at least one user-specific targeted action include:
         engage in one or more of the organized credit card campaigns ("Opt-in");
         disengage from one or more of the organized credit card campaigns ("Opt-out"); and
         request communication from the system ("Contact");
      initiate displaying, via the user software application, the communication including the at least one user-specific targeted action related to the organized credit card campaigns and the user selectable mechanism on the graphical user interface of the at least one user device; and
      initiate the at least one user-specific targeted action related to the organized credit card campaigns when the user selectable mechanism is engaged by the user.

2. The system of claim 1, wherein the user selectable mechanism is configured to be engaged by direct contact of the user with the graphical user interface of the at least one user device.

3. The system of claim 1, wherein the user selectable mechanism includes at least one control element to select the one or more predefined options associated with the at least one user-specific targeted action.

4. The system of claim 1, wherein the at least one user-specific targeted action is completed by at least one of the computing system and the agent device of the financial institution.

5. The system of claim 1, wherein the at least one user-specific targeted action is a communication from the agent device of the financial institution.

6. The system of claim 1, wherein, upon execution of the computer-readable instructions, the computing system is further configured to provide personal data of at least one user to be used by the agent device of the financial institution for the at least one user-specific targeted action.

7. The system of claim 1, wherein, upon execution of the computer-readable instructions, the computing system is further configured to receive upon selection of the one or more predefined options associated with the at least one user-specific targeted action, from the at least one user device, via the network connection, a communication related to the at least one user-specific targeted action.

8. The system of claim 7, wherein, upon execution of the computer-readable instructions, the computing system is further configured to transmit an electronic notification to the agent device of the financial institution to initiate the at least one user-specific targeted action upon receipt of the communication related to the at least one user-specific targeted action from the at least one user device.

9. The system of claim 7, wherein, upon execution of the computer-readable instructions, the computing system is further configured to store the communication related to the at least one user-specific targeted action as personal data of at least one user.

10. A method for improving network efficiency of a financial institution using targeted action selection, comprising the steps of:
   providing an agent device of the financial institution configured to wirelessly communication with at least one user device, wherein the agent device is configured to execute a software application;
   providing a computing system including at least one processing device and at least one memory device, wherein the computing system executes computer-readable instructions;
   providing a network connection operatively connecting the agent device, the at least one user device, and the computing system, the network connection configured to permit network data flow between the agent device, the at least one user device, and the computing system;
   initiating a machine learning program to predict at least one targeted action that can be communicated through digital communication and has an increased likelihood of user engagement;
   deploying the machine learning program as a predictive model;
   providing, via a graphical user interface of the at least one user device, a user software application to a user for installation on the at least one user device, wherein the at least one user device is configured to wirelessly communicate with the computing system via the user software application;
   receiving, via the user software application installed on the at least one user device, personal data of the user, wherein the personal data includes one or more credit card transactions between the user and the financial institution and one or more credit card transactions between the user and one or more financial entities external to the financial institution;
   generating, via the computing system, a personal data set based upon the personal data of the user, the personal data set comprising data relating to responses to queries, where the queries are posed to the user by the computing system and linked to a particular topic, where the particular topic is included as part of an organized credit card campaign of the financial institution, wherein a completion of the queries is a term for user eligibility in the organized credit card campaign;
   applying the personal data set of the user to the predictive model;
   identifying, based on applying the personal data set to the predictive model, at least one user-specific targeted action related to a plurality of organized credit card campaigns of the financial institution predicted to have an increased probability of positive engagement with the user such that digital communications transmitted to the user device are more user-specific;
   determining, based on the personal data set, an occurrence of at least one triggering condition, wherein the at least one triggering condition relates to one or more credit card transactions between the user and the financial institution and one or more credit card transactions between the user and the one or more financial entities external to the financial institution;
   determining, based on the personal data set, whether one of more variables of the personal data of the user meets specific criteria set by the system, wherein the specific criteria includes exceeding one or more established thresholds;
   transmitting, via the network connection, a communication including the at least one user-specific targeted action related to the organized credit card campaigns to the at least one user device, wherein the communication includes a user selectable mechanism for the user to select one or more predefined options associated with the at least one user-specific targeted action related to the organized credit card campaigns, wherein the occurrence of the at least one triggering condition causes the communication including the at least one user-specific targeted action and the user selectable mechanism to be provided to the at least user device when the specific criteria for the one or more variables of the personal data of the user is satisfied, and wherein the predefined options associated with the at least one user-specific targeted action include:
      engage in one or more of the organized credit card campaigns ("Opt-in");
      disengage from one or more of the organized credit card campaigns ("Opt-out"); and
      request communication from the system ("Contact");
   displaying, via the user software application, the communication including the at least one user-specific targeted action related to the organized credit card campaigns and the user selectable mechanism on the graphical user interface of the at least one user device; and
   initiating the at least one user-specific targeted action related to the organized credit card campaigns when the user selectable mechanism is engaged by the user.

11. The method of claim 10, wherein the user selectable mechanism is configured to be engaged by direct contact of the user with the graphical user interface of the at least one user device.

12. The method of claim 10, wherein the user selectable mechanism includes at least one control element to select the one or more predefined options associated with the at least one user-specific targeted action.

13. The method of claim 10, wherein the at least one user-specific targeted action is completed by at least one of the computing system and the agent device of the financial institution.

14. The method of claim 10, wherein the at least one user-specific targeted action is a communication from the agent device of the financial institution.

15. The method of claim 10, wherein, upon execution of the computer-readable instructions, the computing system is further configured to provide personal data of at least one user to be used by the agent device of the financial institution for the at least one user-specific targeted action.

16. The method of claim 10, wherein, upon execution of the computer-readable instructions, the computing system is further configured to receive upon selection of the one or more predefined options associated with the at least one user-specific targeted action, from the at least one user device, via the network connection, a communication related to the at least one user-specific targeted action.

17. The method of claim 16, wherein, upon execution of the computer-readable instructions, the computing system is further configured to transmit an electronic notification to the agent device of the financial institution to initiate the at least one user-specific targeted action upon receipt of the communication related to the at least one user-specific targeted action from the at least one user device.

18. The method of claim 16, wherein, upon execution of the computer-readable instructions, the computing system is further configured to store the communication related to the at least one user-specific targeted action as personal data of at least one user.

\* \* \* \* \*